US010699192B1

(12) United States Patent
Kim et al.

(10) Patent No.: US 10,699,192 B1
(45) Date of Patent: Jun. 30, 2020

(54) METHOD FOR OPTIMIZING HYPERPARAMETERS OF AUTO-LABELING DEVICE WHICH AUTO-LABELS TRAINING IMAGES FOR USE IN DEEP LEARNING NETWORK TO ANALYZE IMAGES WITH HIGH PRECISION, AND OPTIMIZING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/262,985

(22) Filed: Jan. 31, 2019

(51) Int. Cl.
*G06N 3/08* (2006.01)
*G06K 9/62* (2006.01)
*G06N 7/00* (2006.01)

(52) U.S. Cl.
CPC ............ *G06N 3/082* (2013.01); *G06K 9/6277* (2013.01); *G06N 3/084* (2013.01); *G06N 7/005* (2013.01)

(58) Field of Classification Search
CPC ............ G06N 20/00; G06N 3/08; G06N 20/10
See application file for complete search history.

(56) References Cited

U.S. PATENT DOCUMENTS 10,318,827 B2 * 6/2019 Jia ..................... G06K 9/00805

OTHER PUBLICATIONS

Karpathy, A., et al., "Large-scale Video Classification with Convolutional Neural Networks", 2014, The IEEE Conference on Computer Vision and Pattern Recognition (CVPR), 2014, pp. 1725-1732. (Year: 2014).*

(Continued)

*Primary Examiner* — Kakali Chaki
*Assistant Examiner* — Nader Metwalli
(74) *Attorney, Agent, or Firm* — Xsensus LLP

(57) ABSTRACT

A method for optimizing a hyperparameter of an auto-labeling device performing auto-labeling and auto-evaluating of a training image to be used for learning a neural network is provided for computation reduction and achieving high precision. The method includes steps of: an optimizing device, (a) instructing the auto-labeling device to generate an original image with its auto label and a validation image with its true and auto label, to assort the original image with its auto label into an easy-original and a difficult-original images, and to assort the validation image with its own true and auto labels into an easy-validation and a difficult-validation images; and (b) calculating a current reliability of the auto-labeling device, generating a sample hyperparameter set, calculating a sample reliability of the auto-labeling device, and optimizing the preset hyperparameter set. This method can be performed by a reinforcement learning with policy gradient algorithms.

10 Claims, 8 Drawing Sheets

(56) References Cited

OTHER PUBLICATIONS

Derczynski, L., "Complementarity, F-score, and NLP Evaluation", 2016,Proceedings of the Tenth International Conference on Language Resources and Evaluation (LREC 2016), pp. 261-266. (Year: 2016).*

Mousavian, A., et al. " 3D Bounding Box Estimation Using Deep Learning and Geometry", 2017,The IEEE Conference on Computer Vision and Pattern Recognition (CVPR), 2017, pp. 7074-7082 (Year: 2017).*

Hosang, J., et al., "Learning Non-Maximum Suppression", 2017, The IEEE Conference on Computer Vision and Pattern Recognition (CVPR), 2017, pp. 4507-4515 (Year: 2017).*

* cited by examiner

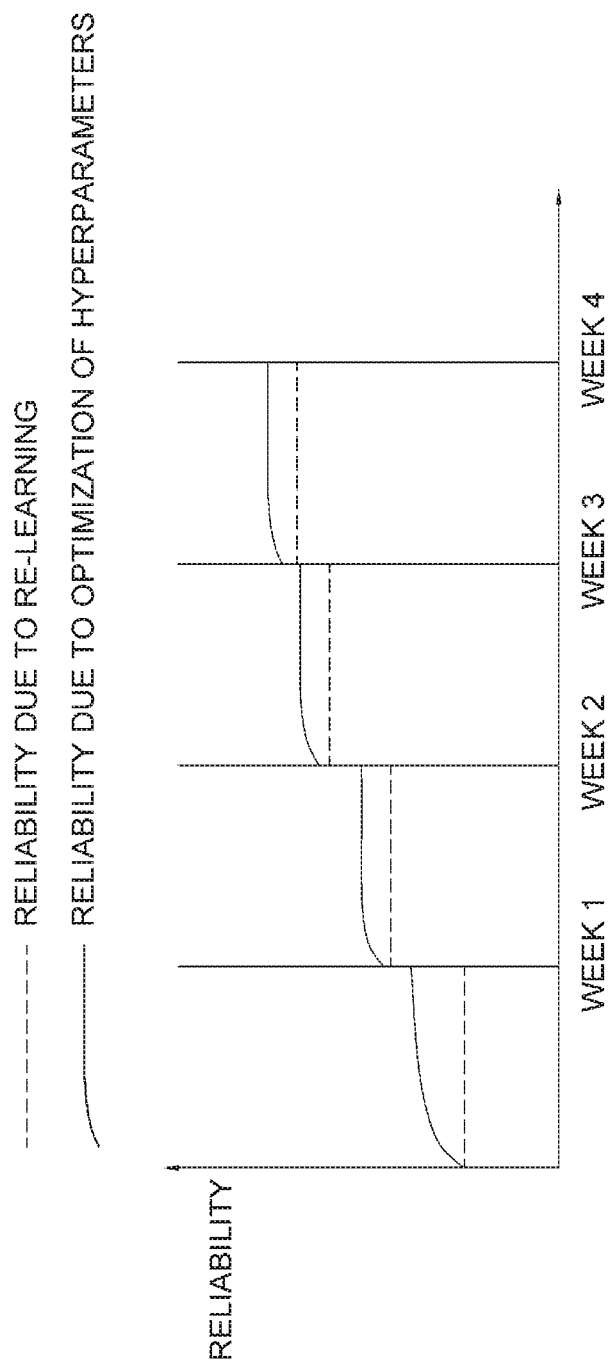

METHOD FOR OPTIMIZING HYPERPARAMETERS OF AUTO-LABELING DEVICE WHICH AUTO-LABELS TRAINING IMAGES FOR USE IN DEEP LEARNING NETWORK TO ANALYZE IMAGES WITH HIGH PRECISION, AND OPTIMIZING DEVICE USING THE SAME

FIELD OF THE DISCLOSURE

The present disclosure relates to a method and a device for optimizing hyperparameters of an auto-labeling device performing auto-labeling of one or more training images to be used for learning a neural network.

BACKGROUND OF THE DISCLOSURE

Recently, methods of performing object identification and the like using machine learning are being studied. As one of the machine learning methods, deep learning, which uses a neural network with several hidden layers between an input layer and an output layer, shows high recognizing performance.

And, the neural network using deep learning generally learns through backpropagation using losses.

In order to perform learning of such a deep learning network, training data in which tags, i.e., labels, are added to individual data points by labelers are needed. Preparing this training data (i.e., classifying the data correctly) can be very labour-intensive, expensive and inconvenient, especially if a large amount of training data is to be used and if the quality of the data pre-preparation is not consistently high. Conventional interactive labeling can be computationally expensive and fail to deliver good results.

Therefore, recently, auto-labeling which adds tags, i.e., labels, to training images using a deep learning-based auto labeling device is performed, and inspectors examine auto-labeled training images to correct the tags or the labels.

Accuracies of such conventional auto-labeling devices are being improved by re-learning.

However, there is a limit to the accuracies that can be improved by the re-learning of the auto-labeling devices, and higher accuracies require repetitive re-learning.

Also, the re-learning capable of improving the accuracies of the auto-labeling devices requires a huge amount of time, thus it takes an extended period of time to achieve useful accuracies of the auto-labeling devices.

SUMMARY OF THE DISCLOSURE

It is an object of the present disclosure to solve all the aforementioned problems.

It is another object of the present disclosure to improve an accuracy of an auto-labeling device without re-learning.

It is still another object of the present disclosure to improve the accuracy of the auto-labeling device even during the re-learning.

In accordance with one aspect of the present disclosure, there is provided a method for optimizing one or more hyperparameters of an auto-labeling device performing auto-labeling of one or more training images to be used for learning a neural network, including steps of: (a) an optimizing device, if one or more original images to be labeled and one or more validation images with their own true labels having shooting environments similar to those of the original images are acquired, instructing the auto-labeling device having at least one preset hyperparameter set to generate original images with their own auto labels and validation images with their own true labels and auto labels by respectively auto-labeling the original images and the validation images with their own true labels, to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels; and (b) the optimizing device, if the easy-validation images with their own true labels and auto labels are acquired, calculating a current reliability, corresponding the preset hyperparameter set, of the auto-labeling device by referring to the easy-validation images with their own true labels and auto labels, generating one or more sample hyperparameter sets adjusted according to at least one certain rule corresponding to the preset hyperparameter set, calculating each of sample reliabilities, corresponding to each of the sample hyperparameter sets, of the auto-labeling device, and optimizing the preset hyperparameter set such that the current reliability corresponding to the preset hyperparameter set is adjusted in a direction of the sample reliabilities corresponding to specific sample hyperparameter sets becoming high, wherein the specific sample hyperparameter sets are part, having their corresponding sample reliabilities higher than the current reliability corresponding to the preset hyperparameter set, of the sample hyperparameter sets.

As one example, the method further includes a step of: (c) the optimizing device optimizing the preset hyperparameter set such that the current reliability, corresponding to the preset hyperparameter set, is equal to or greater than a prescribed value, and that a ratio of the easy-original images with their own auto labels to the original images with their own auto labels is maximized.

As one example, the auto-labeling device includes a difficult-image recognition network which assorts the original images with their own auto labels into the easy-original images with their own auto labels and the difficult-original images with their own auto labels, and assorts the validation images with their own true labels and auto labels into the easy-validation images with their own true labels and auto labels and the difficult-validation images with their own true labels and auto labels, and, at the step of (c), the optimizing device optimizes the preset hyperparameter set including (i) a first set value for the difficult-image recognition network to calculate each of probabilities of each of auto labels of the original images with their own auto labels belonging to an abnormal class and to calculate each of probabilities of each of auto labels of the validation images with their own true labels and auto labels belonging to the abnormal class and, (ii) a second set value for the difficult-image recognition network to determine whether the original images with their own auto labels are the difficult-original images with their own auto labels and whether the validation images with their own true labels and auto labels are the difficult-validation images with their own true labels and auto labels.

As one example, at the step of (b), the optimizing device instructs a reliability-evaluating network to calculate the current reliability of the auto-labeling device by referring to true labels and auto labels of the easy-validation images with their own true labels and auto labels.

As one example, supposing that true labels and auto labels of the easy-validation images with their own true labels and auto labels are respectively $X_{AL}$ and $L_{AL}$ and Precision($X_{AL}$, $L_{AL}$)=1−[the number of misdetection labels in $L_{AL}$]/[a total number of labels in $L_{AL}$], Recall($X_{AL},L_{AL}$)=1−[the number of non-detection labels in $X_{AL}$]/[a total number of labels in $X_{AL}$], the current reliability of the auto-labeling device is evaluated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

As one example, the auto-labeling device includes an object detection network which generates the original images with their own auto labels and the validation images with their own true labels and auto labels, by auto-labeling the original images and the validation images with their own true labels, and, at the step of (b), the optimizing device optimizes at least part of one or more preset hyperparameters in the preset hyperparameter set including each score threshold for each class, each NMS threshold for each class, each bounding box voting threshold for each class, and each minimum object size for each class of the object detection network.

In accordance with another aspect of the present disclosure, there is provided an optimizing device for optimizing one or more hyperparameters of an auto-labeling device performing auto-labeling of one or more training images to be used for learning a neural network, including: at least one memory that stores instructions; and at least one processor configured to execute the instructions to perform processes of: (I) if one or more original images to be labeled and one or more validation images with their own true labels having shooting environments similar to those of the original images are acquired, instructing the auto-labeling device having at least one preset hyperparameter set to generate original images with their own auto labels and validation images with their own true labels and auto labels by respectively auto-labeling the original images and the validation images with their own true labels, to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels, and (II), if the easy-validation images with their own true labels and auto labels are acquired, calculating a current reliability, corresponding the preset hyperparameter set, of the auto-labeling device by referring to the easy-validation images with their own true labels and auto labels, generating one or more sample hyperparameter sets adjusted according to at least one certain rule corresponding to the preset hyperparameter set, calculating each of sample reliabilities, corresponding to each of the sample hyperparameter sets, of the auto-labeling device, and optimizing the preset hyperparameter set such that the current reliability corresponding to the preset hyperparameter set is adjusted in a direction of the sample reliabilities corresponding to specific sample hyperparameter sets becoming high, wherein the specific sample hyperparameter sets are part, having their corresponding sample reliabilities higher than the current reliability corresponding to the preset hyperparameter set, of the sample hyperparameter sets.

As one example, the processor further performs a process of: (III) optimizing the preset hyperparameter set such that the current reliability, corresponding to the preset hyperparameter set, is equal to or greater than a prescribed value, and that a ratio of the easy-original images with their own auto labels to the original images with their own auto labels is maximized.

As one example, the auto-labeling device includes a difficult-image recognition network which assorts the original images with their own auto labels into the easy-original images with their own auto labels and the difficult-original images with their own auto labels, and assorts the validation images with their own true labels and auto labels into the easy-validation images with their own true labels and auto labels and the difficult-validation images with their own true labels and auto labels, and, at the process of (III), the processor optimizes the preset hyperparameter set including (i) a first set value for the difficult-image recognition network to calculate each of probabilities of each of auto labels of the original images with their own auto labels belonging to an abnormal class and to calculate each of probabilities of each of auto labels of the validation images with their own true labels and auto labels belonging to the abnormal class and, (ii) a second set value for the difficult-image recognition network to determine whether the original images with their own auto labels are the difficult-original images with their own auto labels and whether the validation images with their own true labels and auto labels are the difficult-validation images with their own true labels and auto labels.

As one example, at the process of (II), the processor instructs a reliability-evaluating network to calculate the current reliability of the auto-labeling device by referring to true labels and auto labels of the easy-validation images with their own true labels and auto labels.

As one example, supposing that true labels and auto labels of the easy-validation images with their own true labels and auto labels are respectively $X_{AL}$ and $L_{AL}$ and Precision($X_{AL}$, $L_{AL}$)=1−[the number of misdetection labels in $L_{AL}$]/[a total number of labels in $L_{AL}$], Recall($X_{AL},L_{AL}$)=1−[the number of non-detection labels in $X_{AL}$]/[a total number of labels in $X_{AL}$], the current reliability of the auto-labeling device is evaluated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

As one example, the auto-labeling device includes an object detection network which generates the original images with their own auto labels and the validation images with their own true labels and auto labels, by auto-labeling the original images and the validation images with their own true labels, and, at the process of (II), the processor optimizes at least part of one or more preset hyperparameters in the preset hyperparameter set including each score threshold for each class, each NMS threshold for each class, each bounding box voting threshold for each class, and each minimum object size for each class of the object detection network.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 8 is a drawing schematically illustrating a process of improving an accuracy of the auto-labeling device in a method for optimizing the hyperparameters of the auto-labeling device for auto-labeling the training images to be used for learning the neural network in accordance with one example of the present disclosure.

DETAILED DESCRIPTION OF THE PREFERRED EMBODIMENTS

Figure 1:
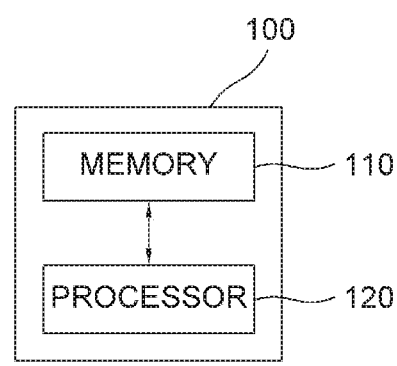
FIG. 1 is a drawing schematically illustrating an optimizing device which optimizes one or more hyperparameters of an auto-labeling device for auto-labeling one or more training images to be used for learning a neural network in accordance with one example of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating an optimizing device which optimizes one or more hyperparameters of an auto-labeling device for auto-labeling one or more training images to be used for learning a neural network, e.g., a deep learning network, which analyzes images, in accordance with one example of the present disclosure. By referring to FIG. 1, the optimizing device 100 may include a memory 110 for storing instructions to optimize the hyperparameters of the auto-labeling device, and a processor 120 for performing processes corresponding to the instructions in the memory 110 to optimize the hyperparameters of the auto-labeling device.

Specifically, the optimizing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 2:
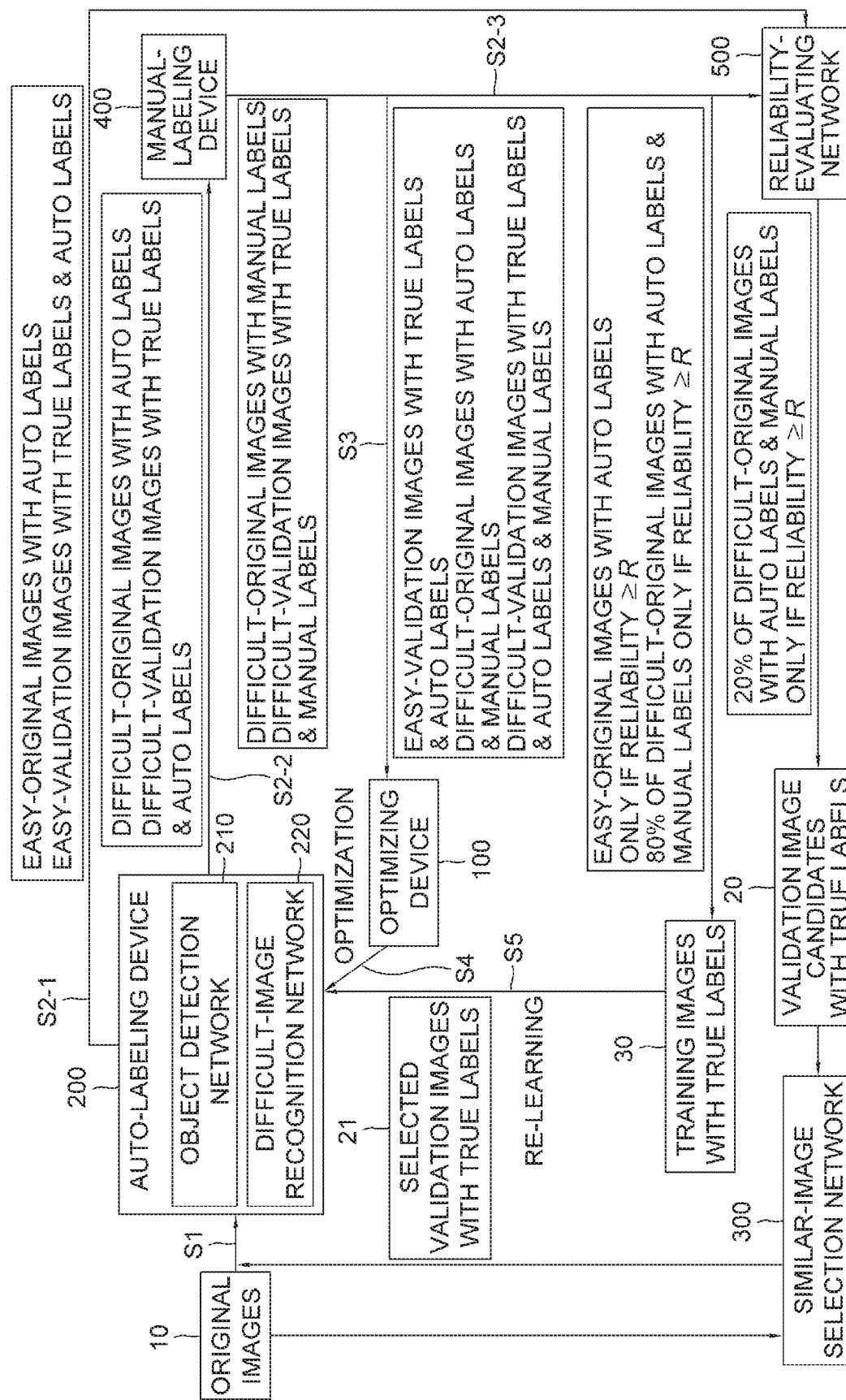
FIG. 2 is a drawing schematically illustrating a method for optimizing the hyperparameters of the auto-labeling device for auto-labeling the training images to be used for learning the neural network in accordance with one example of the present disclosure.

A process of optimizing the hyperparameters of the auto-labeling device for auto-labeling the training images to be used for learning the neural network, by using the optimizing device 100 in accordance with one example of the present disclosure is described by referring to FIG. 2.

First, if one or more original images 10 to be labeled and one or more validation image candidates 20 with their own true labels having shooting environments similar to those of the original images are acquired at a step of S1, the optimizing device 100 may instruct the auto-labeling device 200 having at least one preset hyperparameter set to generate original images with their own auto labels and validation images with their own true labels and auto labels by respectively auto-labeling the original images 10 and the validation image candidates 20 with their own true labels.

That is, if the original images 10 to be labeled are acquired, the optimizing device 100 may instruct a similar-image selection network 300 to select each of validation images 21 with their own true labels having the shooting environments similar to those of the original images 10 for each of the original images 10. Then, the optimizing device 100 may input the original images 10 and the validation images 21 with their own true labels into the auto-labeling device 200, and may instruct the auto-labeling device 200 to auto-label the original images 10 and the validation images 21 with their own true labels.

Then, the original images 10 and the validation images 21 with their own true labels may be auto-labeled by the auto-labeling device 200 respectively, resulting in original images with their own auto labels and the validation images with their own true labels and auto labels.

Figure 3:
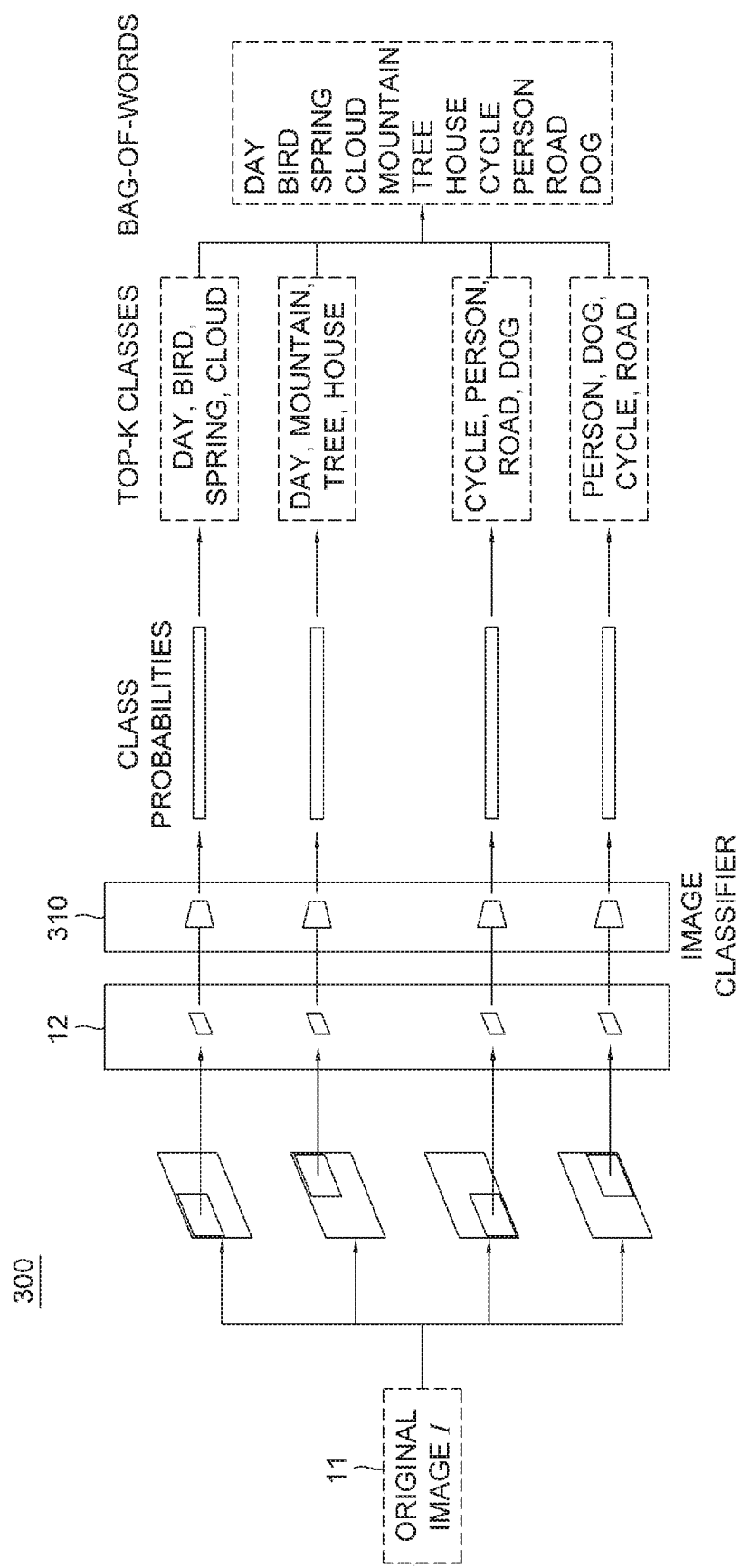
FIG. 3 is a drawing schematically illustrating a process for selecting one or more validation images having shooting environments similar to those of one or more original images in a method for optimizing the hyperparameters of the auto-labeling device for auto-labeling the training images to be used for learning the neural network in accordance with one example of the present disclosure.

A method of the similar-image selection network 300 selecting the validation images with their own true labels having the similar shooting environments to those of the original images 10 is described by referring to FIG. 3 as below.

If the optimizing device 100 inputs the acquired original images into the similar-image selection network 300, the similar-image selection network 300 may generate manipulated images 12 by cropping and resizing each of regions of each of sliding windows on an arbitrary image 11 among the original images. Herein, as another example, the optimizing device 100, not the similar-image selection network 300, may generate the manipulated images 12 by cropping and resizing each of regions of each of the sliding windows on the arbitrary image 11, and may input each of the manipulated images corresponding to each of the original images into the similar-image selection network 300.

Then, the similar-image selection network 300 may instruct image classifiers 310 to classify the manipulated images 12, to thereby generate each piece of top-k class information. As one example, the image classifiers 310 may generate each of feature maps of each of the manipulated images 12, may classify objects into class groups like day, bird, spring, cloud, mountain, tree, house, cycle, person, road, and dog by using each of the feature maps, and may output top k pieces of the class information. Herein, top 4 pieces of the class information is shown in the drawing, but the scope of the present disclosure is not limited thereto. Also, the drawing shows the multiple image classifiers 310 each of which corresponds to each of the manipulated images 12, however, a single image classifier may be used to generate the top-k pieces of the class information corresponding to each of the manipulated images, or a certain number of the image classifiers different from the number of the corresponding manipulated images may be used to generate the top-k pieces of the class information.

And the similar-image selection network 300 may generate at least one bag-of-words histogram of the original images by applying at least one operation, of creating at least one bag of words to all of the original images, by referring to the top-k pieces of the class information corresponding to each of the manipulated images outputted from the image classifiers 310.

Thereafter, the similar-image selection network 300 may select a predetermined number of the validation images 21 with their own true labels, in an order of closest to the bag-of-words histogram, among the validation image candidates 20 with their own true labels, and may transmit the predetermined number of the validation images 21 and the original images to the auto-labeling network 200, for auto-labeling. Herein, the similar-image selection network 300 may manage difficult-validation images with their own true labels among the predetermined number of the validation image candidates and difficult-original images, such that the number of the difficult-validation images with their own true labels among the predetermined number of the validation image candidates with their own true labels has a certain ratio to the number of the difficult-original images among the original images. As one example, the number of the difficult-validation images with their own true labels among the predetermined number of the validation image candidates with their own true labels may be 10% of the number of the difficult-original images among the original images.

Also, if the original images 10 and the validation images 21 with their own true labels are acquired, the auto-labeling device 200 may instruct an object detection network 210 to generate bounding boxes of objects on the original images 10 and on the validation images 21 with their own true labels, to thereby auto-label the original images 10 and the validation images 21 with their own true labels.

Figure 4:
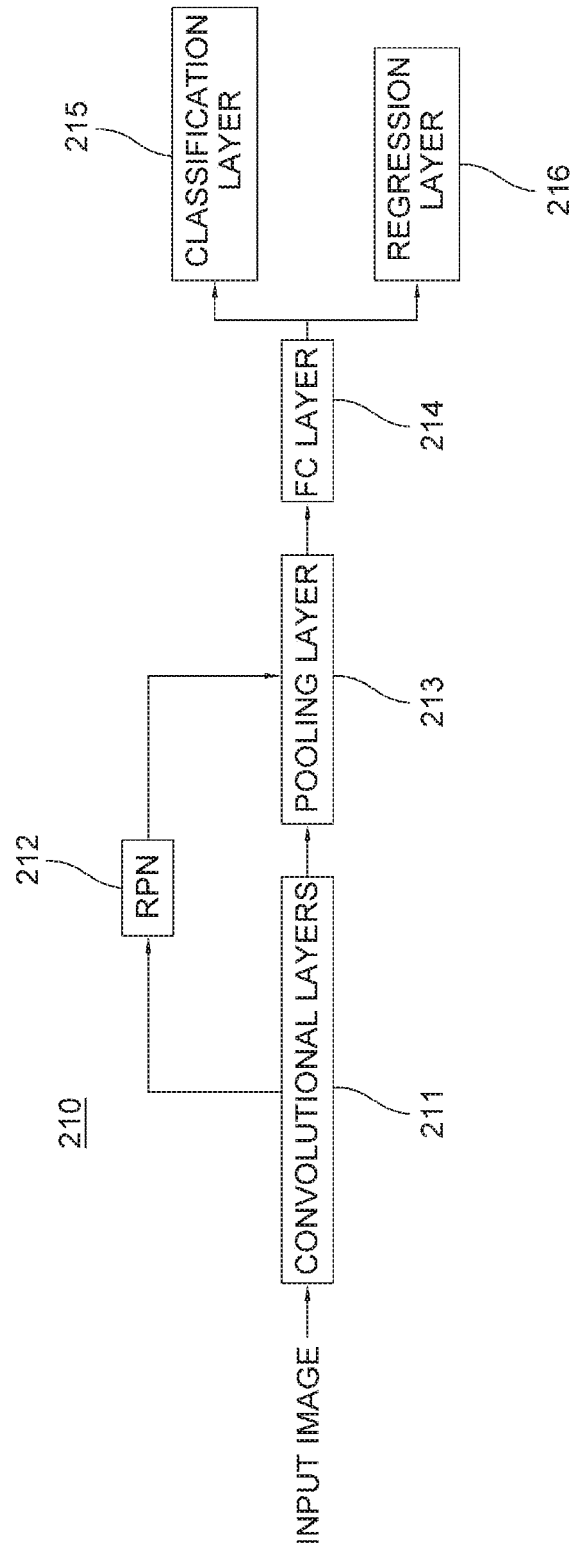
FIG. 4 is a drawing schematically illustrating a process of performing object detection for auto-labeling in a method of optimizing the hyperparameters of the auto-labeling device for auto-labeling the training images to be used for learning the neural network in accordance with one example of the present disclosure.

A method for the object detection network 210 to generate the bounding boxes on the original images 10 and the validation images 21 with their own true labels is described by referring to FIG. 4.

If one of the original images 10 and the validation images 21 with their own true labels is acquired as an input image, the object detection network 210 may instruct one or more convolutional layers 211 to generate at least one feature map for object detection by applying the convolution operations to the input image. Herein, the convolutional layers 211 may generate the feature map for object detection by sequentially applying the convolution operations to the input image.

Then the object detection network 210 may instruct at least one RPN (Region Proposal Network) 212 to generate proposal boxes corresponding to candidate regions, estimated as including the objects, on the feature map for object detection.

Thereafter, the object detection network 210 may instruct at least one pooling layer 213 to generate one or more feature vectors by applying one or more pooling operations to regions, corresponding to the proposal boxes, on the feature map for object detection.

And the object detection network 210 may instruct at least one FC (fully connected) layer 214 to apply at least one fully-connected operation to the feature vectors, instruct at least one classification layer 215 to output each piece of object class information corresponding to each of the proposal boxes, and instruct at least one regression layer 216 to generate the bounding boxes resulting from each of the proposal boxes bounding each of the objects.

Herein, the object detection network 210 may instruct the classification layer 215 to output the object class information corresponding to the proposal boxes according to each score threshold for each class, one of preset hyperparameters in the preset hyperparameter set. That is, the classification layer 215 may determine a specific class having a highest score, among each of scores for each class corresponding to a specific bounding box, as specific class information of the specific bounding box, and may output the specific class, if a specific score of the specific class is equal to or greater than a preset specific class score threshold, as the object class information of the specific bounding box.

Also, by using an NMS (non-maximum suppression), the object detection network 210 may select and output a single bounding box among the duplicate bounding boxes corresponding to a single object, according to an NMS threshold, one of the preset hyperparameters in the preset hyperparameter set.

Also, by using a bounding box voting threshold and a minimum object size which are part of the preset hyperparameters, the object detection network 210 may select and output each precisely-bounding box, corresponding to each of the objects, among the multiple bounding boxes.

Meanwhile, the object detection network 210 may have been learned beforehand. That is, at least part of one or more parameters of the FC layer 214 and the convolutional layers 211 may have been adjusted by backpropagating one or more losses. Also, the RPN 212 may have been learned beforehand.

By referring to FIG. 2 again, the optimizing device 100 may instruct the auto-labeling device 200 to respectively assort the original images with their own auto labels and the validation images with their own true labels and auto labels into easy images and difficult images, to be described later. That is, the optimizing device 100 may instruct the auto-labeling device 200 to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels.

And the auto-labeling device 200 may instruct a difficult-image recognition network 220 to assort the input images into the easy images and the difficult images, and the difficult images may have a probability of being automatically labeled incorrectly equal to or greater than a prescribed value γ, and the easy images may have a probability of being automatically labeled incorrectly less than the prescribed value.

Figure 5:
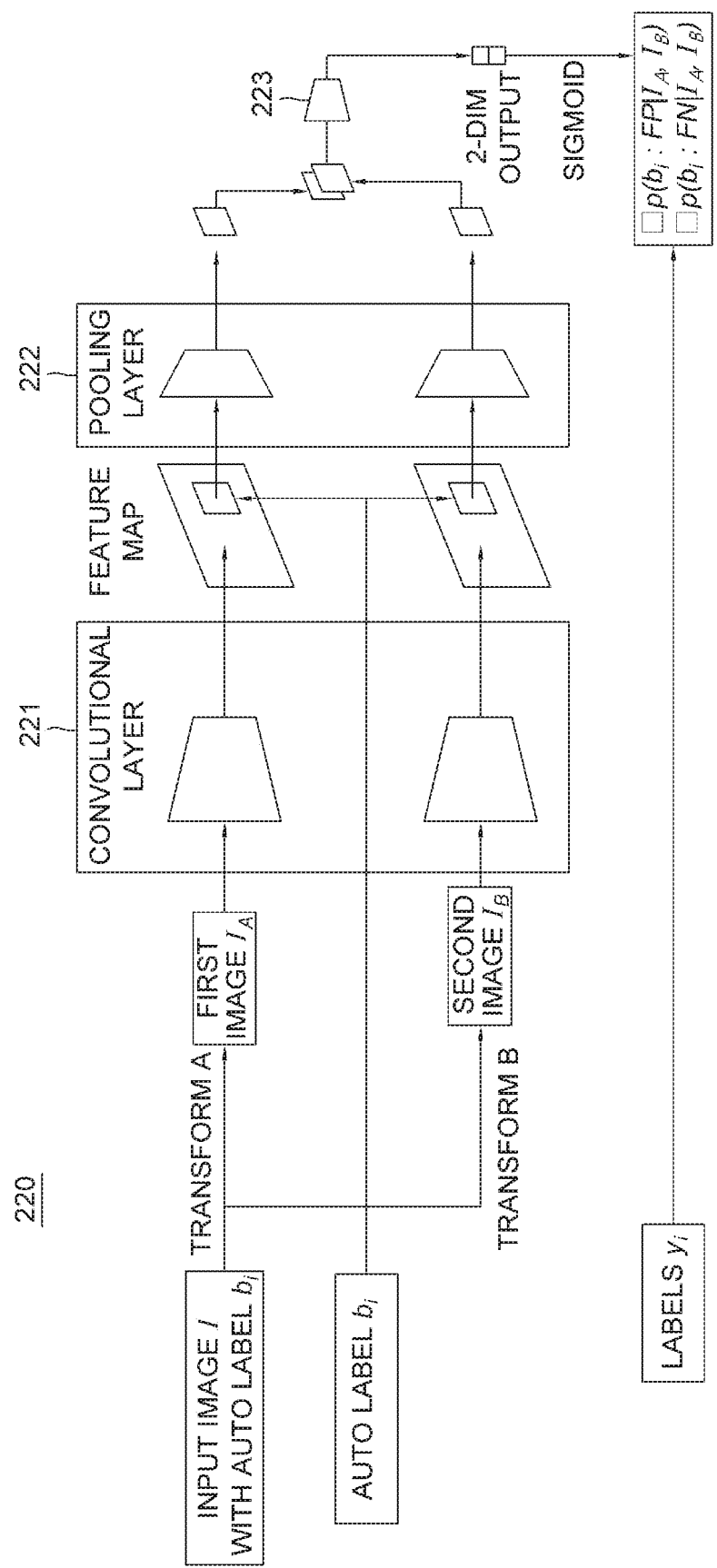
FIG. 5 is a drawing schematically illustrating a process of classifying one or more difficult images in a method for optimizing the hyperparameters of the auto-labeling device capable of auto-labeling the training images to be used for learning the neural network in accordance with one example of the present disclosure.

A method of assorting the original images with their own auto labels and the validation images with their own true labels and auto labels that are auto-labeled by the difficult-image recognition network 220 of the auto-labeling device 200 respectively into easy-original images with their own auto labels and difficult-original images with auto labels, easy-validation images with their own true labels and auto labels and difficult-validation images with their own true labels and auto labels is described by referring to FIG. 5.

If at least one input image I with their own auto label k is inputted, which is one of the auto-labeled original images with their own auto labels and the auto-labeled validation images with their own true labels and auto labels, then the difficult-image recognition network 220 may generate a first image $I_A$ and a second image $I_B$, where if only one of the first image and the second image is transformed from the input image then the other is the input image used as is. Herein, at least one of the first image $I_A$ and the second image $I_B$ may be transformed from the input image I.

In a process of generating the first image $I_A$ and the second image $I_B$, at least one image pair of the first image and the second image corresponding to the input image I may be generated by using one or more transformation pairs which include one or more first functions for transforming the first image and their corresponding second functions for transforming the second image.

The transformation pairs may be represented as follows, as one example.

| Index | The first image | The second image |
|---|---|---|
| 1 | Resized 480P | Resized 540P |
| 2 | Resized 640P | Resized 720P |
| 3 | Resized 900P | Resized 1080P |
| 4 | Original | Horizontal flip |
| 5 | Original | Gamma 0.5 |
| 6 | Original | Gamma 1.5 |

That is, more than one image pair of the first image and the second image, corresponding to the transformation pairs set according to the input image, may be generated.

Next, the difficult-image recognition network 220 may instruct one or more convolutional layers 211 to apply one or more convolution operations respectively to the first image $I_A$ and the second image $I_B$, to thereby generate at least one first feature map and at least one second feature map. Herein, the convolutional layers 211 may be included in the object detection network which performs auto-labeling in FIG. 4. As one example, if the object detection network uses an ensemble of multi transforms, the transformation pairs may be defined by using only the transforms used by the object detection network, and as a result, a feature map outputted from the convolutional layers in the object detection network may be used without any further process, thus time required for computation of the feature map is reduced.

Next, the difficult-image recognition network 220 may instruct one or more pooling layers 222 to generate each of first pooled feature maps by respectively applying one or more pooling operations to each region, corresponding to each auto label $b_i$, on the first feature map, and to generate each of second pooled feature maps by respectively applying the pooling operations to each region, corresponding to said each auto label $b_i$, on the second feature map, and to generate each of concatenated feature maps by concatenating each of the first pooled feature maps and each of the second pooled feature maps respectively corresponding to said each auto label $b_i$. Herein, although FIG. 5 shows two of the convolutional layers 221 and two of the pooling layers 222, a single convolutional layer and a single pooling layer may be used for the convolution operations on the first image and the second image and for the pooling operations on the first feature map and the second feature map.

And, the difficult-image recognition network 220 may instruct at least one deep learning classifier 223 to acquire each of the concatenated feature maps, corresponding to said each auto label $b_i$, as its input, to thereby generate the class information which classifies said each auto label $b_i$ into an abnormal class group or a normal class group. Herein, the abnormal class group may include a misdetection class group and a non-detection class group, and the normal class group may include a class group for auto labels each of which is classified as an object and a class group for auto labels each of which is classified as a background. Classification of the auto label $b_i$ is described in a learning process of the deep learning classifier 223 by referring to FIG. 6.

Thereafter, the difficult-image recognition network 220 may (i) calculate each of one or more probabilities of each of abnormal class elements in the abnormal class group by referring to each piece of the class information on said each auto label $b_i$, and (ii) determine whether the input image I is the difficult image by using each of the probabilities of each of the abnormal class elements.

Herein, a sigmoid function may be applied to outputs of the deep learning classifier 223 and then the probabilities of each of the abnormal class elements may be calculated. The probabilities of each of the abnormal class elements may include each of probabilities of misdetection class elements in the misdetection class group and each of probabilities of non-detection class elements in the non-detection class group.

As one example, the probabilities of the misdetection class elements FP may be represented by $p(b_i:FP|I_A,I_B)$ and the probabilities of the non-detection class elements FN may be represented by $p(b_i:FN|I_A,I_B)$.

Herein, $b_i$ may be one of the auto labels, $I_A$ may be the first image, and $I_B$ may be the second image.

Also, for each auto label $b_i$, the difficult-image recognition network 220 may calculate each of the probabilities of each of the abnormal class elements corresponding to each of the transformation pairs and may calculate at least one weighted average over said each of the probabilities of each of the abnormal class elements.

That is, the probabilities $p(b_i:FP)$ of the misdetection class elements and the probabilities $p(b_i:FN)$ of the non-detection class elements may be expressed as follows.

$$p(b_i: FP) = \frac{1}{\sum_j w_j} \sum_j w_j p(b_i: FP | I_{A_j}, I_{B_j})$$

$$p(b_i: FN) = \frac{1}{\sum_j w_j} \sum_j w_j p(b_i: FN | I_{A_j}, I_{B_j})$$

Herein, because the probabilities $p(b_i:FP)$ of the misdetection class elements and the probabilities $p(b_i:FN)$ of the non-detection class elements are linear functions of weights $w_j$ which is a first set value in the preset hyperparameter set, the weights may be optimized by using a constrained optimization with constraints $\Sigma_j w_j = 1$.

Then, if at least one generalized mean over each of the probabilities of each of the abnormal class elements is equal to or greater than a second set value, the difficult-image recognition network 220 may determine the input image as the difficult image.

As one example, the difficult-image recognition network 220 may calculate each of probabilities p(I:Difficult) by using the following generalized mean, of the input image with its own auto labels being the difficult image, by referring to each of the probabilities $p(b_i:FP)$ of the misdetection class elements and each of the probabilities $p(b_i:FN)$ of the non-detection class elements of each auto label $$p(I: \text{Difficult}) = \left( \frac{1}{N_I} \sum_{b_i \in B_I} p(b_i: FP)^p + \frac{1}{N_I} \sum_{b_i \in B_I} p(b_i: FN)^p \right)^{1/p} \geq \gamma$$

And, if each of the probabilities p(I:Difficult) calculated by referring to each of the probabilities $p(b_i:FP)$ of the misdetection class elements and each of the probabilities $p(b_i:FN)$ of the non-detection class elements of each auto label $b_i$ is determined as larger than or equal to the second set value $\gamma$ in the preset hyperparameter set, the difficult-image recognition network 220 may determine the input image as the difficult image. Herein, the difficult image may represent an image which has a probability of being automatically labeled incorrectly larger than or equal to the second set value.

Herein, the second set value $\gamma$ may be a highest hit rate among hit rates for correct answers to the validation images which are manually inspected after auto-labeling of the auto-labeling device.

Figure 6:
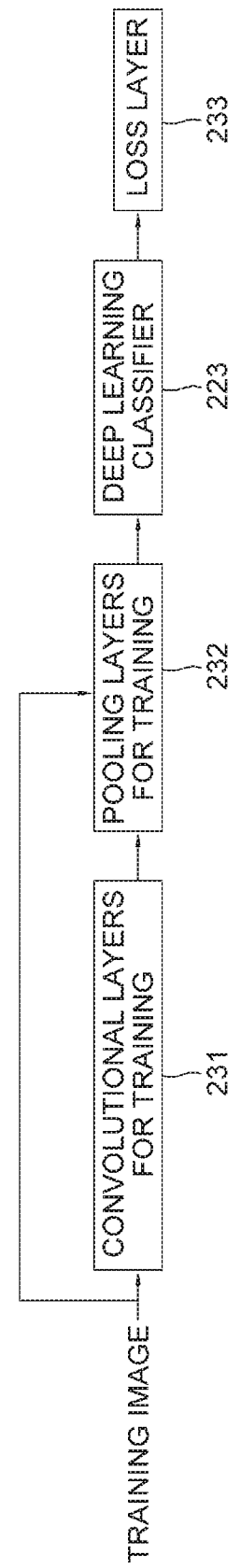
FIG. 6 is a drawing schematically illustrating a process of learning a neural network classifying the difficult images in a method for optimizing the hyperparameters of the auto-labeling device capable of auto-labeling the training images to be used for learning the neural network in accordance with one example of the present disclosure.

Meanwhile, the deep learning classifier 223 may include multiple fully connected layers or a fully convolutional network, and a process of learning the deep learning classifier 223 is described by referring to FIG. 6 as below.

If at least one training image with its own true labels and auto labels auto-labeled by the auto-labeling device is acquired, a learning device 230 may instruct one or more convolutional layers 231 for training to apply its convolution operations to the training image, to thereby generate at least one feature map for training.

Herein, the auto labels of the training image may be generated arbitrarily for learning, unlike the auto labels labeled by the auto-labeling device.

Also, the learning device 230 may include a memory (not illustrated) for storing instructions to learn the deep learning class classifier 223, and a processor (not illustrated) for performing learning of the deep learning class classifier 223 corresponding to the instructions in the memory.

Specifically, the learning device 230 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. The processor of the computing device may include hardware configuration of MPU (Micro Processing Unit) or CPU (Central Processing Unit), cache memory, data bus, etc. Additionally, the computing device may further include OS and software configuration of applications that achieve specific purposes. Such description of the computing device does not exclude an integrated device including any combination of a processor, a memory, a medium, or any other computing components for implementing the present disclosure.

Next, the learning device 230 may instruct at least one pooling layer 232 for training to generate one or more pooled feature maps for training by respectively applying its one or more pooling operations to each of regions, corresponding to each of the auto labels, on the feature map for training.

Then, the learning device 230 may instruct the deep learning classifier 223 to acquire each of the pooled feature maps for training corresponding to each of the auto labels as its input and to generate the class information which classifies the auto labels into the abnormal class group or the normal class group.

Herein, the class information may include the abnormal class group having the misdetection class group and the non-detection class group. And the class information may include two dimensional outputs.

As one example, the misdetection class group (FP, $y_i$=[1, 0]) may refer to a case that a first specific true label with the class information same as that of a first specific auto label does not overlap with any other of the true labels by a value equal to or greater than the first set value.

Herein, the misdetection class group (FP, $y_i$=[1,0]) may be represented as $$\max_{t_j : c[b_i] = c[t_j]} IoU(b_i, t_j) < \alpha.$$

And the non-detection class group (FN, $y_i$=[0,1]) may refer to a case that, on condition that a second specific auto label with the class information same as that of a second specific true label does not overlap with any other of the auto labels by a value equal to or greater than the second set value, a third specific auto label overlaps with the second specific true label by a value equal to or greater than a third set value.

Herein, the non-detection class group (FN, $y_i$=[0,1]) may be represented as $$\max_{b_i : c[b_i] = c[t_j]} IoU(b_i, t_j) < \alpha, \, y_i = [0, 1]) : IoU(b_i, t_j) \geq \beta.$$

$y_i$=[0,1]): IoU($b_i$,$t_j$)≥β.

As one example, it may be configured such that α=0.9 and β=0.5, but the scope of the present disclosure is not limited thereto.

And the normal class group ($y_i$=[0,0]) may include any other class groups excluding the misdetection class group and the non-detection class group, and may correspond to the objects and the background.

Meanwhile, to prevent an imbalance of the classes, the learning device 230 may manage the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

Herein, the learning device 230 may adjust the number of group elements of the misdetection class group FP, the number of group elements of the non-detection class group FN, and the number of group elements of the normal class group by using a random sampling.

Then, the learning device 230 may instruct at least one loss layer 233 to calculate one or more losses by referring to each piece of the class information on each of the auto labels and its corresponding ground truth, to thereby learn at least part of parameters of the deep learning classifier 223 by backpropagating the losses.

Herein, the learning device 230 may perform the backpropagating by using a cross-entropy loss.

Meanwhile, the learning may mean adjustment of weights which are synaptic strengths of any of two connected layers in a neural network of the deep learning classifier 223, such that the losses become smaller.

As one example, if the backpropagating is performed by using a stochastic gradient descent (SGD), each of the weights may be adjusted as follows.

$$\Delta w_{ij}(t+1) = \Delta w_{ij}(t) + lr \frac{\partial C}{\partial w_{ij}}$$

lr may depict a learning rate and C may depict a cost function.

Herein, the cost function may be determined by referring to factors like types of learning, e.g., supervised learning, unsupervised learning, and reinforcement learning, and an activation function, etc.

For example, if a learning to solve a multi-class classification problem is performed, a softmax function and a cross-entropy function may be used respectively for the activation function and the cost function in general.

The softmax function may be represented as $$p_j = \frac{\exp(x_j)}{\sum_k \exp(x_k)},$$

and the cost function may be represented as C=−$\Sigma_j d_j \log(p_j)$.

Herein, $p_j$ may depict a class probability, and $x_j$ and $x_k$ may depict respectively a total input into a unit j and the total input into a unit k. And, $d_j$ may depict a target probability of an output unit j, and $p_j$ may depict a probability output of the output unit j after its corresponding activation function is applied.

The above example of the backpropagating the losses shows the stochastic gradient descent (SGD), however, the scope of the present disclosure is not limited thereto, and the backpropagating for learning of the neural network may be performed by using a momentum, a Nesterov's Accelerated Gradient (NAG), an AdaGrad (Adaptive Gradient), an RMSProp, an AdaDelta (Adaptive Delta), or an Adam (Adaptive Moment Estimation).

By referring to FIG. 2 again, the optimizing device 100 may instruct the auto-labeling device 200 to transmit the easy-original images with their own auto labels and the easy-validation images with their own true labels and auto labels to a reliability-evaluating network 500 at a step of S2-1.

Also, the optimizing device 100 may instruct the auto-labeling device 200 to transmit the difficult-original images with their own auto labels and the difficult-validation images with their own true labels and auto labels to a manual-labeling device 400 at a step of S2-2. Then, the manual-labeling device 400 may perform manual-labeling, i.e., correcting incorrect labels of the received difficult-original images with their own auto labels and the received difficult-validation images with their own true labels and auto labels, and may transmit the manually labeled difficult-original images with their own auto labels and manual labels and the manually labeled difficult-validation images with their own true labels, auto labels and manual labels to the reliability-evaluating network 500, at a step of S2-3.

Thereafter, the optimizing device 100 may instruct the reliability-evaluating network 500 to evaluate a reliability of the auto-labeling device 200 and a reliability of the manual-labeling device 400, by referring to the received easy-original images with their own auto labels, the received easy-validation images with their own true labels and auto labels, the received difficult-original images with their own auto labels and manual labels, and the received difficult-validation images with their own true labels, auto labels and manual labels.

Herein, the reliability-evaluating network 500 may evaluate the reliability of the auto-labeling device 200 by referring to true labels and auto labels of the easy-validation images with their own true labels and auto labels received from the auto-labeling device 200.

Herein, supposing that true labels and auto labels of the easy-validation images with their own true labels and auto labels are respectively $X_{AL}$ and $L_{AL}$ and Precision($X_{AL}$,$L_{AL}$) =1−[the number of misdetection labels in $L_{AL}$]/[a total number of labels in $L_{AL}$], Recall($XL_{AL}$)=1−[the number of non-detection labels in $X_{AL}$]/[a total number of labels in $X_{AL}$], the current reliability of the auto-labeling device 200 may be evaluated by $$\text{Reliability}(AL) =$$
$$F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

Also, the reliability-evaluating network 500 may evaluate the reliability of the manual-labeling device 400 by referring to true labels and manual labels of the difficult-validation images with their own true labels, auto labels and manual labels received from the manual-labeling device 400.

Herein, supposing that true labels and manual labels of the difficult-validation images with their own true labels, auto labels and manual labels are respectively $X_{HL}$ and $L_{HL}$ and Precision($X_{HL}$, $L_{HL}$)=1−[the number of misdetection labels in $L_{HL}$]/[a total number of labels in $L_{HL}$], Recall($XH_L$, $L_{HL}$)=1−[the number of non-detection labels in $X_{F/L}$]/[a total number of labels in $X_{HL}$], the current reliability of the manual-labeling device 400 may be evaluated by $$\text{Reliability}(HL) =$$
$$F_1(X_{HL}, L_{HL}) = 2\frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}$$

The optimizing device 100 is shown above as instructing the reliability-evaluating network 500 to calculate the reliability of the auto-labeling device 200 and the reliability of the manual-labeling device 400, however, the optimizing device 100 may calculate the reliability of the auto-labeling device 200 and the reliability of the manual-labeling device 400 following the processes above.

Next, if the reliability of the auto-labeling device 200 is equal to or greater than the prescribed value, the optimizing device 100 may select part of the easy-original images with their own auto labels and the difficult-original images with their own auto labels and manual labels as training images 30 with their own true labels for re-learning, and may select the rest of the difficult-original images with their own auto labels and manual labels as the validation image candidates 20 with their own true labels.

Then, if the calculated reliability of the auto-labeling device, i.e., the current reliability of the auto-labeling device, is acquired at a step of S3, the optimizing device 100 may generate one or more sample hyperparameter sets HP′ adjusted as per at least one certain rule corresponding to the preset hyperparameter set HP according to the current reliability of the auto-labeling device.

Herein, the sample hyperparameter sets HP′ may be generated by selectively adjusting part of the hyperparameters in the preset hyperparameter set HP and then arbitrarily combining the adjusted hyperparameters. This is because each effect of each change of each of the hyperparameters on the reliability is not independent of each other.

Thereafter, the optimizing device 100 may calculate sample reliabilities each of which is a reliability, corresponding to each of the sample hyperparameter sets HP′, of the auto-labeling device 200. Herein, the sample reliabilities may be calculated by repeating the process above, on condition that the preset hyperparameter set HP of the auto-labeling device 200 is replaced with each of the sample hyperparameter sets HP′, but the scope of the present disclosure is not limited thereto, and may be calculated by a simulation of applying each of the sample hyperparameter sets HP′ to each output generated by the process above using the preset hyperparameter set HP.

Figure 7:
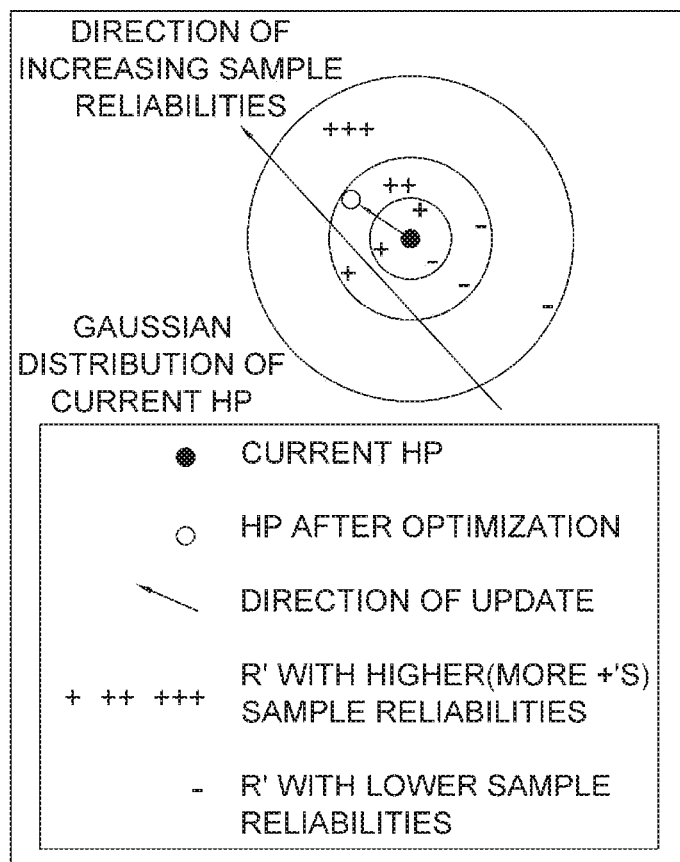
FIG. 7 is a drawing schematically illustrating a process of optimizing the hyperparameters of the auto-labeling device for auto-labeling the training images to be used for learning the neural network in accordance with one example of the present disclosure.

Then, by referring to FIG. 7, the sample hyperparameter sets HP′, corresponding to each of the sample reliabilities based on a location of a current hyperparameter set HP corresponding to the current reliability, may have a Gaussian distribution.

Herein, the optimizing device 100 may determine part, having their corresponding sample reliabilities higher than the current reliability, of the sample hyperparameter sets HP′ as specific sample hyperparameter sets, and may acquire a direction of the sample reliabilities becoming high by referring to specific sample reliabilities of the determined specific sample hyperparameter sets.

Thereafter, the optimizing device 100 may adjust individual hyperparameters in the preset hyperparameter set, i.e., in the current hyperparameter set HP, such that the current reliability is adjusted corresponding to a direction of the specific sample reliabilities becoming high, to thereby generate the adjusted hyperparameter set, and may optimize the preset hyperparameter set of the auto-labeling device 200 by using the adjusted hyperparameter set, at a step of S4.

Herein, the individual hyperparameters of the auto-labeling device 200 being adjusted may include each score threshold for each class, each NMS threshold for each class, each bounding box voting threshold for each class, and each minimum object size for each class, of the object detection network 210 in the auto-labeling device 200.

Also, in a process of the optimizing device 100 instructing the auto-labeling device 100 to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels, the optimizing device 100 may optimize the preset hyperparameter set such that the current reliability, corresponding to the preset hyperparameter set, is equal to or greater than the prescribed value, and that a ratio of the easy-original images with their own auto labels to the original images with their own auto labels is maximized.

That is, the optimizing device 100 may optimize the preset hyperparameter set including (i) the first set value (weights $w_1$) for the difficult-image recognition network 220 of the auto-labeling device 200 to calculate each of probabilities of each of auto labels of the original images with their own auto labels belonging to the abnormal class and to calculate each of probabilities of each of auto labels of the validation images with their own true labels and auto labels belonging to the abnormal class and, (ii) the second set value γ, i.e., the prescribed value, for the difficult-image recognition network 220 of the auto-labeling device 200 to determine whether the original images with their own auto labels are the difficult-original images with their own auto labels and whether the validation images with their own true labels and auto labels are the difficult-validation images with their own true labels and auto labels.

As a result, the reliability of the auto-labeling device 200 may be improved, even without the re-learning by using the optimized hyperparameter set.

Meanwhile, the optimizing device 100 may use the training images with their own true labels to re-learn the auto-labeling device 200 at a step of S5, to thereby improve the reliability of the auto-labeling device 200, and may optimize the preset hyperparameter set by using the processes above during the re-learning of the auto-labeling device 200, to thereby improve the reliability of the auto-labeling device 200 additionally.

That is, by referring to FIG. 8, if the re-learning is performed weekly, then the reliability will be improved in a manner of a staircase, however, if the hyperparameters are optimized in accordance with the present disclosure, the higher reliability is guaranteed, and accordingly, the training images with their own true labels which have higher reliabilities for re-learning are acquired. Also, by performing the re-learning using the training images with their own true labels with higher reliabilities, the reliability of the auto-labeling device resulting from the re-learning is improved further than that resulting from conventional techniques.

The present disclosure has an effect of optimizing the hyperparameters of the auto-labeling device by reflecting inspection results of the auto-labeling device without re-learning, to thereby improve the accuracy of the auto-labeling device.

The present disclosure has another effect of optimizing the hyperparameters of the auto-labeling device by reflecting the inspection results of the auto-labeling device during the re-learning, to thereby improve the accuracy of the auto-labeling device.

The present disclosure has still another effect of acquiring more reliable training data due to the higher accuracy, to thereby further improve the accuracy of the auto-labeling device at a next session of re-learning.

The present disclosure has still yet another effect of providing the auto-labeling device capable of performing auto-labeling and auto-evaluating of the training image with reduced computations and high precision.

Further, the method can be performed by a reinforcement learning with policy gradient algorithms.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for optimizing one or more hyperparameters of an auto-labeling device performing auto-labeling of one or more training images to be used for learning a neural network, comprising steps of:

(a) an optimizing device having a non-transitory computer readable medium and a processor configured to execute instructions stored in the non-transitory computer-readable medium so as to configure the processor to, when one or more original images to be labeled and one or more validation images with their own true labels having shooting environments similar to those of the original images are acquired, instructing the auto-labeling device having at least one preset hyperparameter set to generate original images with their own auto labels and validation images with their own true labels and auto labels by respectively auto-labeling the original images and the validation images with their own true labels, to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels, the difficult-original images having a probability greater than a prescribed value y of being automatically labeled incorrectly, and the easy-original images having a probability less than the prescribed value y;

(b) the optimizing device, when the easy-validation images with their own true labels and auto labels are acquired, calculating a current reliability, corresponding to the preset hyperparameter set, of the auto-labeling device by referring to the easy-validation images with their own true labels and auto labels, generating one or more sample hyperparameter sets adjusted according to at least one certain rule corresponding to the preset hyperparameter set, calculating each of sample reliabilities, corresponding to each of the sample hyperparameter sets, of the auto-labeling device, and optimizing the preset hyperparameter set such that the current reliability corresponding to the preset hyperparameter set is adjusted in a direction of the sample reliabilities corresponding to specific sample hyperparameter sets becoming high, wherein the specific sample hyperparameter sets are part, having their corresponding sample reliabilities higher than the current reliability corresponding to the preset hyperparameter set, of the sample hyperparameter sets;

an object detection network of the auto-labeling device, generating and auto-labeling the original images with their own auto labels and the validation images with their own true labels and auto labels; and optimizing by the optimizing device at step (b) at least part of one or more preset hyperparameters in the preset hyperparameter set including each score threshold for each class, each non-maximum suppression (NMS) threshold for each class, each bounding box voting threshold for each class, and each minimum object size for each class of the object detection network, such that the at least one or more preset hyperparameters optimized by the optimizing device improve an auto-labeling accuracy of the one or more training images provided by the auto-labeling device for learning the neural network.

2. The method of claim 1, wherein the method further comprises:
(c) the optimizing device optimizing the preset hyperparameter set such that the current reliability, corresponding to the preset hyperparameter set, is equal to or greater than a prescribed value, and that a ratio of the easy-original images with their own auto labels to the original images with their own auto labels is maximized.

3. The method of claim 2, wherein the auto-labeling device includes a difficult-image recognition network which assorts the original images with their own auto labels into the easy-original images with their own auto labels and the difficult-original images with their own auto labels, and assorts the validation images with their own true labels and auto labels into the easy-validation images with their own true labels and auto labels and the difficult validation images with their own true labels and auto labels, and wherein, at the step of (c), the optimizing device optimizes the preset hyperparameter set including (i) a first set value for the difficult-image recognition network to calculate each of probabilities of each of auto labels of the original images with their own auto labels belonging to an abnormal class and to calculate each of probabilities of each of auto labels of the validation images with their own true labels and auto labels belonging to the abnormal class and, (ii) a second set value for the difficult-image recognition network to determine whether the original images with their own auto labels are the difficult-original images with their own auto labels and whether the validation images with their own true labels and auto labels are the difficult-validation images with their own true labels and auto labels.

4. The method of claim 1, wherein, at the step of (b), the optimizing device instructs a reliability-evaluating network to calculate the current reliability of the auto-labeling device by referring to true labels and auto labels of the easy-validation images with their own true labels and auto labels.

5. The method of claim 4, wherein, supposing that true labels and auto labels of the easy-validation images with their own true labels and auto labels are respectively $X_{AL}$ and $L_{AL}$ and Precision $(X_{AL}, L_{AL})$=1−[the number of mis-detection labels in $L_{AL}$]/[a total number of labels in $L_{AL}$], Recall$(X_{AL}, L_{AL})$=1−[the number of non-detection labels in $X_{AL}$]/[a total number of labels in $X_{AL}$], the current reliability of the auto-labeling device is evaluated by $$\text{Reliability}(AL) = F_1(X_{AL}, L_{AL}) = 2 \frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}.$$

6. An optimizing device for optimizing one or more hyperparameters of an auto labeling device performing auto-labeling of one or more training images to be used for learning a neural network, comprising:
at least one memory that stores instructions; and
at least one processor configured to execute the instructions to perform processes of: (I) when one or more original images to be labeled and one or more validation images with their own true labels having shooting environments similar to those of the original images are acquired, instructing the auto-labeling device having at least one preset hyperparameter set to generate original images with their own auto labels and validation images with their own true labels and auto labels by respectively auto-labeling the original images and the validation images with their own true labels, to assort the original images with their own auto labels into easy-original images with their own auto labels and difficult-original images with their own auto labels, and to assort the validation images with their own true labels and auto labels into easy-validation images with their own true labels and auto labels and difficult-validation images with their own true labels and auto labels, the difficult-original images having a probability greater than a prescribed value y of being automatically labeled incorrectly, and the easy-original images having a probability less than the prescribed value y, and (II), when the easy-validation images with their own true labels and auto labels are acquired, calculating a current reliability, corresponding the preset hyperparameter set, of the auto-labeling device by referring to the easy-validation images with their own true labels and auto labels, generating one or more sample hyperparameter sets adjusted according to at least one certain rule corresponding to the preset hyperparameter set, calculating each of sample reliabilities, corresponding to each of the sample hyperparameter sets, of the auto-labeling device, and optimizing the preset hyperparameter set such that the current reliability corresponding to the preset hyperparameter set is adjusted in a direction of the sample reliabilities corresponding to specific sample hyperparameter sets becoming high, wherein the specific sample hyperparameter sets are part, having their corresponding sample reliabilities higher than the current reliability corresponding to the preset hyperparameter set, of the sample hyperparameter sets, the auto-labeling device includes an object detection network that generates and auto-labels the original images with their own auto labels and the validation images with their own true labels and auto labels, and at the process of (II), the processor is configured to optimize at least part of one or more preset hyperparameters in the preset hyperparameter set including each score threshold for each class, each non-maximum suppression (NMS) threshold for each class, each bounding box voting threshold for each class, and each minimum object size for each class of the object detection network, such that the at least one or more preset hyperparameters optimized by the processor of the optimizing device improve an auto-labeling accuracy of the one or more training images provided by the auto-labeling device for learning the neural network.

7. The optimizing device of claim 6, wherein the processor further performs a process of:
  (III) optimizing the preset hyperparameter set such that the current reliability, corresponding to the preset hyperparameter set, is equal to or greater than a prescribed value, and that a ratio of the easy-original images with their own auto labels to the original images with their own auto labels is maximized.

8. The optimizing device of claim 7, wherein the auto-labeling device includes a difficult-image recognition network which assorts the original images with their own auto labels into the easy-original images with their own auto labels and the difficult-original images with their own auto labels, and assorts the validation images with their own true labels and auto labels into the easy-validation images with their own true labels and auto labels and the difficult-validation images with their own true labels and auto labels, and
  wherein, at the process of (III), the processor optimizes the preset hyperparameter set including (i) a first set value for the difficult-image recognition network to calculate each of probabilities of each of auto labels of the original images with their own auto labels belonging to an abnormal class and to calculate each of probabilities of each of auto labels of the validation images with their own true labels and auto labels belonging to the abnormal class and, (ii) a second set value for the difficult-image recognition network to determine whether the original images with their own auto labels are the difficult-original images with their own auto labels and whether the validation images with their own true labels and auto labels are the difficult-validation images with their own true labels and auto labels.

9. The optimizing device of claim 6, wherein, at the process of (II), the processor instructs a reliability-evaluating network to calculate the current reliability of the auto-labeling device by referring to true labels and auto labels of the easy-validation images with their own true labels and auto labels.

10. The optimizing device of claim 9, wherein, supposing that true labels and auto labels of the easy-validation images with their own true labels and auto labels are respectively $X_{AL}$ and $L_{AL}$ and Precision $(X_{AL}, L_{AL})$=1-[the number of misdetection labels in $L_{AL}$]/[a total number of labels in $L_{AL}$], Recall $(X_{AL},L_{AL})$=1-[the number of non-detection labels in $X_{AL}$]/[a total number of labels in $X_{AL}$], the current reliability of the auto-labeling device is evaluated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}.$$

* * * * *